(12) United States Patent
Messaoudi et al.

(10) Patent No.: US 10,141,871 B2
(45) Date of Patent: Nov. 27, 2018

(54) METHOD AND SYSTEM FOR CONTROLLING A CONTROL INSTALLATION OF AN ELECTRIC MOTOR

(71) Applicant: SCHNEIDER TOSHIBA INVERTER EUROPE SAS, Pacy sur Eure (FR)

(72) Inventors: Mehdi Messaoudi, Vernon (FR); Hocine Boulharts, Triel sur Seine (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 22 days.

(21) Appl. No.: 15/397,983

(22) Filed: Jan. 4, 2017

(65) Prior Publication Data
US 2017/0244343 A1 Aug. 24, 2017

(30) Foreign Application Priority Data
Feb. 18, 2016 (FR) ...................... 16 51320

(51) Int. Cl.
| | |
|---|---|
| *H02P 5/74* | (2006.01) |
| *H02M 1/26* | (2006.01) |
| *H02M 7/23* | (2006.01) |
| *H02M 7/46* | (2006.01) |
| *H02M 5/458* | (2006.01) |
| *H02M 1/12* | (2006.01) |

(52) U.S. Cl.
CPC .............. *H02P 5/74* (2013.01); *H02M 1/126* (2013.01); *H02M 5/4585* (2013.01); *H02M 7/23* (2013.01); *H02M 7/46* (2013.01); *H02M 2001/123* (2013.01)

(58) Field of Classification Search
CPC ....... H02P 5/74; H02M 1/126; H02M 5/4585; H02M 2001/123; H02M 7/46; H02M 7/23
USPC ........................................... 318/51
See application file for complete search history.

(56) References Cited

U.S. PATENT DOCUMENTS 5,852,558 A * 12/1998 Julian ................ H02M 1/12
363/132
5,933,339 A * 8/1999 Duba ................. H02M 7/49
363/41

(Continued)

OTHER PUBLICATIONS

French Preliminary Search Report dated Oct. 19, 2016 in French Application 16 51320, filed on Feb. 18, 2016 (with English Translation of Categories of Cited Documents and Written Opinion).

*Primary Examiner* — Eduardo Colon Santana
*Assistant Examiner* — Devon Joseph
(74) *Attorney, Agent, or Firm* — Oblon, McClelland, Maier & Neustadt, L.L.P.

(57) ABSTRACT

A control method which is deployed in a control installation of an electric motor, the control installation including a first converter controlled for the application of the first voltage pulse edges to an electric motor of a first pulse width modulation, obtained by comparing a first carrier signal, applied at a first chopping frequency, with a first modulating signal, a second converter controlled of a second pulse width modulation, obtained by comparing a second carrier signal, applied at a second chopping frequency, with a second modulating signal. The control method involves the determination of a notional optimum phase-shift angle on the basis of the first chopping frequency and the second chopping frequency.

18 Claims, 4 Drawing Sheets

(56) References Cited

U.S. PATENT DOCUMENTS

| | | | | |
|---|---|---|---|---|
| 6,510,063 B2* | 1/2003 | Kobayashi | ............ | H02M 1/12 |
| | | | | 363/137 |
| 6,979,916 B2* | 12/2005 | Schienbein | ............ | H02M 7/49 |
| | | | | 307/82 |
| 7,772,790 B2* | 8/2010 | Nashiki | ................ | H02K 1/145 |
| | | | | 318/400.02 |
| 7,920,393 B2* | 4/2011 | Bendre | ................ | H02M 7/487 |
| | | | | 363/127 |
| 8,319,374 B2* | 11/2012 | Wang | ................ | H02J 3/01 |
| | | | | 307/82 |
| 8,493,009 B2* | 7/2013 | Hafner | ............ | A61B 17/1626 |
| | | | | 318/400.17 |
| 9,263,961 B2* | 2/2016 | Jacobson | ......... | H02M 3/33576 |
| 9,270,168 B2* | 2/2016 | White | .................... | H02M 1/44 |
| 9,722,505 B2* | 8/2017 | Wang | ................ | H02M 5/4585 |
| 2002/0070557 A1* | 6/2002 | Geis | ........................ | B60K 6/28 |
| | | | | 290/40 R |
| 2004/0012353 A1* | 1/2004 | Seima | ...................... | H02P 1/40 |
| | | | | 318/432 |
| 2006/0034364 A1* | 2/2006 | Breitzmann | ...... | H02M 7/53871 |
| | | | | 375/238 |
| 2009/0140829 A1* | 6/2009 | Sodo | ...................... | H01F 37/00 |
| | | | | 336/5 |
| 2011/0012543 A1* | 1/2011 | Takizawa | ................ | B60L 3/003 |
| | | | | 318/139 |

* cited by examiner

*Fig. 7*

METHOD AND SYSTEM FOR CONTROLLING A CONTROL INSTALLATION OF AN ELECTRIC MOTOR

TECHNICAL FIELD OF THE INVENTION

The present invention relates to a control method deployed in a control installation for an electric motor, and to a control system employed in said installation for the deployment of said method.

PRIOR ART

The employment of multiple-converter control installations for the control of one or more electric motors is known. A distinction is thus drawn between different architectures:
- In a first architecture, the installation comprises at least two converters of the inverter type, connected in parallel to a common DC supply bus, wherein each of these inverters is designed for the control of a separate electric motor.
- In a second architecture, the installation comprises a first converter of the active rectifier type, connected to the grid system, and a second converter of the inverter type, which is designed for the control of an electric motor.

Conventionally, the switching times of transistors in each converter are determined by pulse width modulation (hereinafter "PWM"). PWM of the intersective type involves the comparison of a symmetrical or asymmetrical triangular carrier signal with one or more modulating signals. In the power transistor of a converter, intersections between a carrier signal and one or more modulating signals define the switching times for the closing and opening of the transistor.

It is known that the increase in the chopping frequency applied to a converter results in an increase in the common mode current. The common mode current generated may flow in various paths between the system and each electric motor. These paths are created by the capacitive couplings generated:
- Between the conductors of the cable connecting each converter to its electric load,
- Between the windings of the motor and the stator, and
- Between the transistors of each converter and the dissipator connected to ground.

Where the installation thus comprises two converters according to one of the two aforementioned architectures, the total common mode voltage is the sum of the interferences generated by each of the converters.

Customarily, a filter is used for the reduction of interference generated. The filter may be comprised of passive and/or active components. In a filtering system based upon passive components, this system must be dimensioned:
- For the achievement of the requisite attenuation of interference, in the interests of compliance with standard predefined thresholds for electromagnetic interference,
- To ensure that its common mode inductance is never saturated.

For the filtering of these common mode voltages, the EMC filter arranged on the input side is frequently overdimensioned in order to satisfy these two constraints, thereby accommodating the least favourable case for the saturation of the magnetic core of the filter inductance.

In an installation executed in accordance with an active rectifier architecture of the aforementioned type, various solutions have been developed for the reduction of the common mode current. These solutions involve, for example, the execution of an action on the control functions of the rectifier and the inverter.

The document JP2003018853 proposes, for example, a method for reducing the common mode current in a speed variator by synchronizing the switching function for the closing (or opening) of three power transistors (high or low) in the rectifier stage with the switching function for the closing (or opening) of three corresponding transistors (respectively high or low) in the inverter stage. This solution permits the reduction of the dimension of the filter employed for the filtering of the common mode current, thereby reducing the cost of the converter.

U.S. Pat. No. 6,185,115 also describes a method for synchronizing the switching functions of the rectifier stage with the switching functions of the inverter stage, thereby reducing the common mode voltage. The proposed method involves the synchronization of the switching of a single switching arm on the inverter stage, with a rising and falling edge, with the switching of a single switching arm on the rectifier stage, thus permitting a reduction, in one chopping interval, from twelve voltage pulse edges to eight voltage pulse edges on all the switching arms.

Patent application EP2442436A2 also describes a method for synchronizing switching functions between the rectifier stage and the inverter stage. This method permits the synchronization of each switching operation in a transistor on the rectifier stage with a switching operation on the inverter stage, thus permitting the reduction of the total common mode voltage generated.

However, the solutions described in these previous patents are not necessarily satisfactory, and cannot be applied in control installations, the architecture of which comprises at least two parallel inverters which are connected to a common DC supply bus.

The object of the invention is therefore the proposal of a control method which permits the maximum restriction of common mode voltage generation, thus permitting the use of a common mode filter of an appropriate rating, and which can be adapted to control installations incorporating at least two converters, arranged in accordance with different topologies.

DISCLOSURE OF THE INVENTION

This object is achieved by a control method which is deployed in an installation for the control of an electric motor, wherein said control installation comprises:
- A number of input phases, which are designed for connection to an electric grid system for the delivery of an AC voltage,
- A common mode filter connected on the input phases, comprising at least one inductance,
- A DC supply bus, which is arranged for the delivery of a DC voltage,
- A first converter connected to said DC supply bus, controlled for the application of the first voltage pulse edges to an electric motor by means of a first pulse width modulation, obtained by comparing a first carrier signal, described as the reference carrier signal, applied at a first chopping frequency, with a first modulating signal,
- A second converter connected to said DC supply bus and controlled by means of a second pulse width modulation, obtained by comparing a second carrier signal, applied at a second chopping frequency, with a second modulating signal, Said second carrier signal being designed to be out-of-phase with the reference carrier signal by a phase-shift angle.

The control method according to the invention involves the determination of an optimum phase-shift angle from the first chopping frequency and the second chopping frequency, wherein said optimum phase-shift angle corresponds to the phase-shift angle for which the maximum magnetic flux received by the inductance of the common mode filter is as low as possible, in order to avoid any saturation of the magnetic core of the inductance.

According to a particular feature, the method involves a step for the determination of a ratio between the first chopping frequency and the second chopping frequency.

According to a further particular feature, the method involves a step for the read-off of a number of a ratio values from a predefined data table and, for each ratio value, of a notional optimum phase-shift angle corresponding to the maximum magnetic flux.

According to a first variant of embodiment, the optimum phase-shift angle corresponds to said notional optimum phase-shift angle, if the control installation has a symmetrical architecture with regard to the ground.

According to a second variant of embodiment, the optimum phase-shift angle corresponds to said notional optimum phase-shift angle, subject to the addition of a corrective value, if the control installation has an asymmetrical architecture with regard to the ground.

According to a particular feature, the corrective value is determined on the basis of the difference between a notional magnetic flux and an actual magnetic flux, measured for the inductance of the common mode filter.

According to a further particular feature, the method involves a step for the detection of the achievement of a minimum value by the first carrier signal, and a step for the synchronization of the second carrier signal in relation to the first carrier signal, in order to take account of the determined optimum phase-shift angle.

According to a further variant of embodiment, the optimum phase-shift angle corresponds to the notional optimum phase-shift angle, subject to the addition of a value of 180°, if the second converter in the control installation is of the active rectifier type.

According to a further variant of embodiment, if the control installation comprises a third converter which is controlled by means of a third pulse width modulation, obtained by the comparison of a third carrier signal, applied at a third chopping frequency, with a third modulating signal, the method comprises the following:
  Determination of a first ratio between the chopping frequency of the first carrier signal and the chopping frequency of the second carrier signal,
  Determination of a second ratio between the chopping frequency of the first carrier signal and the chopping frequency of the third carrier signal,
  Determination of a series of two notional optimum phase-shift angles associated with a series formed by the first ratio and by the second ratio thus determined.

The invention also relates to a control system designed for the deployment of the aforementioned control method, wherein said system comprising at least one control unit, and comprising a module for the determination of an optimum phase-shift angle from the first chopping frequency and the second chopping frequency, wherein said optimum phase-shift angle to be applied corresponds to the phase-shift angle for which the maximum magnetic flux received by the inductance of the common mode filter is as low as possible.

According to a particular feature, the system comprises a module for the determination of a ratio between the first chopping frequency and the second chopping frequency.

According to a further particular feature, the system comprises a module for the read-off of a number of a ratio values from a predefined data table and, for each ratio value, of a notional optimum phase-shift angle corresponding to the maximum magnetic flux thus determined.

According to a first variant of embodiment, the optimum phase-shift angle corresponds to said notional optimum phase-shift angle, if the control installation has a symmetrical architecture with regard to the ground.

According to a further variant of embodiment, the optimum phase-shift angle corresponds to said notional optimum phase-shift angle, subject to the addition of a corrective value, if the control installation has an asymmetrical architecture with regard to the ground.

According to a particular feature, the corrective value is determined on the basis of the difference between a notional magnetic flux and an actual magnetic flux, measured for the inductance of the common mode filter.

According to a further particular feature, the system comprises a module for the detection of the achievement of a minimum value by the first carrier signal, and a module for the synchronization of the second carrier signal in relation to the first carrier signal, in order to take account of the optimum phase-shift angle thus determined.

According to a further variant of embodiment, the optimum phase-shift angle corresponds to the notional optimum phase-shift angle, subject to the addition of a value of 180°, if the second converter in the control installation is of the active rectifier type.

According to a further variant of embodiment, if the control installation comprises a third converter which is controlled by means of a third pulse width modulation, obtained by the comparison of a third carrier signal, applied at a third chopping frequency, with a third modulating signal, the system comprises the following:
  A module for the determination of a first ratio between the chopping frequency of the first carrier signal and the chopping frequency of the second carrier signal,
  A module for the determination of a second ratio between the chopping frequency of the first carrier signal and the chopping frequency of the third carrier signal,
  A module for the determination of a series of two notional optimum phase-shift angles associated with a series formed by the first ratio and by the second ratio thus determined.

BRIEF DESCRIPTION OF THE FIGURES

Further characteristics and advantages will become apparent from the detailed description set out hereinafter, with reference to the attached drawings, in which.

DETAILED DESCRIPTION OF AT LEAST ONE FORM OF EMBODIMENT

The invention discloses a control method which can be adapted to different architectures of installations for the control of an electric motor. It can be adapted to architectures incorporating at least two converters.

In the interests of simplification, although the invention will be described hereinafter for installations having two converters, it should be understood that the principle can be applied to installations having more than two converters. The particular features of operation associated with an installation having more than two converters will be described in detail thereafter.

Figures 1A, 1B:
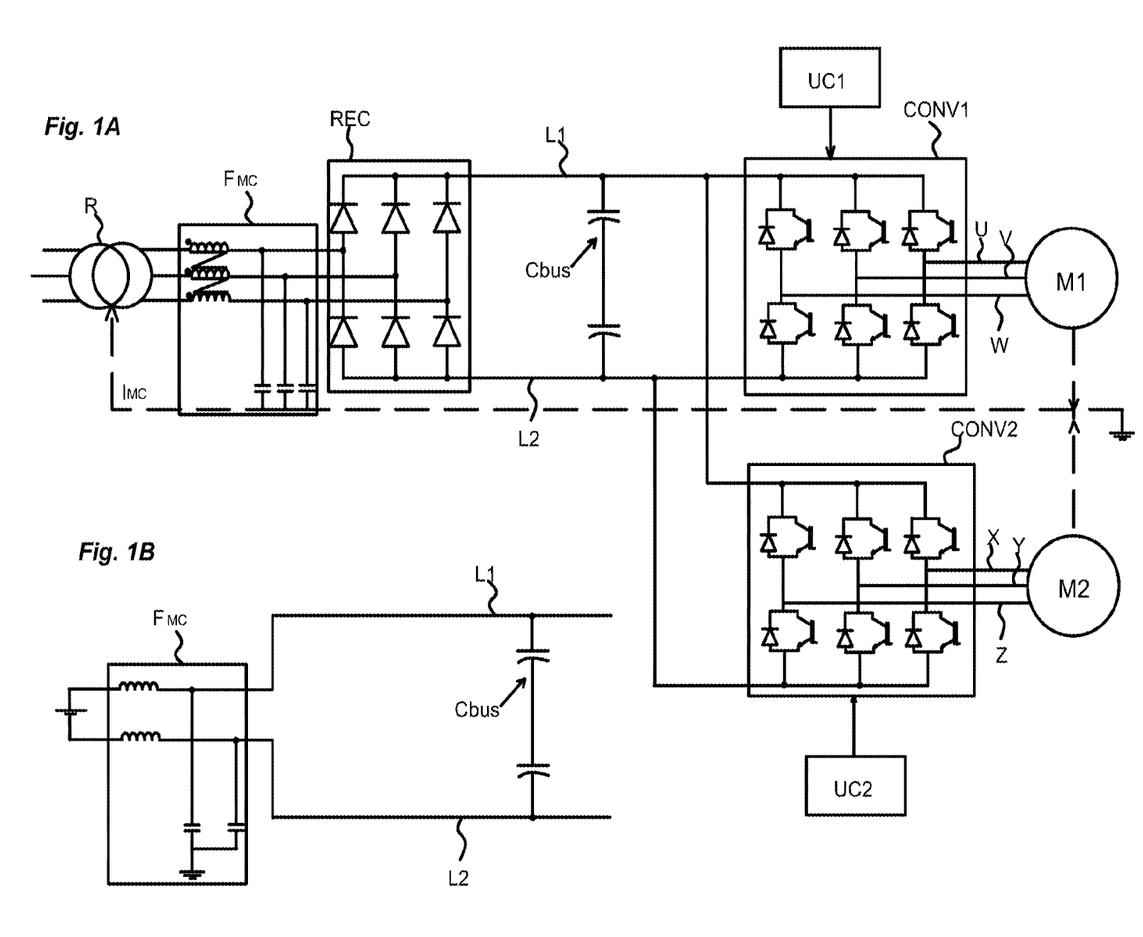
FIGS. 1A and 1B represent the architecture of a control installation for an electric motor, with two parallel inverters connected to a common DC supply bus, each of which is designed for the control of a separate electric motor.

A first installation architecture with two converters is represented in FIG. 1A, and comprises:

A number of input phases connected to an electricity supply system R, for example three input phases, in the event of connection to a three-phase system.

A passive rectifier REC, for example of the diode bridge type, for the transformation of the AC voltage delivered by the supply system into a DC voltage.

A DC supply bus having a first supply line L1 at a positive potential and a second supply line L2 at a negative potential, between which the DC voltage is applied.

At least one bus capacitor Cbus connected between the first supply line L1 and the second supply line L2, and designed to maintain a constant DC voltage on the bus.

A first converter CONV1 of the inverter type, connected to the DC supply bus and comprising a plurality of switching arms connected in parallel between the two supply lines. Each switching arm incorporates at least two transistors, for example of the IGBT type, connected in series.

First output phases U, V, W, wherein each first output phase is connected to a mid-point between two transistors in a separate switching arm of the first converter, and is thus connected to a first electric motor M1.

A second converter CONV2 of the inverter type, connected to the DC supply bus in parallel with the first converter CONV2, and also comprising a plurality of switching arms connected in parallel between the two supply lines. Each switching arm incorporates at least two transistors, for example of the IGBT type, connected in series.

Second output phases X, Y, Z, wherein each second output phase is connected to a mid-point between two transistors in a separate switching arm of the second converter, and is thus connected to a second electric motor M2.

In FIG. 1B, the control installation is connected directly to a DC voltage source, and thus requires no rectifier. However, the down-circuit architecture incorporating two converters, as shown in FIG. 1A, remains identical, and the solution according to the invention described hereinafter is valid for an installation connected to an AC voltage source (FIG. 1A) and to a DC voltage source (FIG. 1B).

Figure 2:
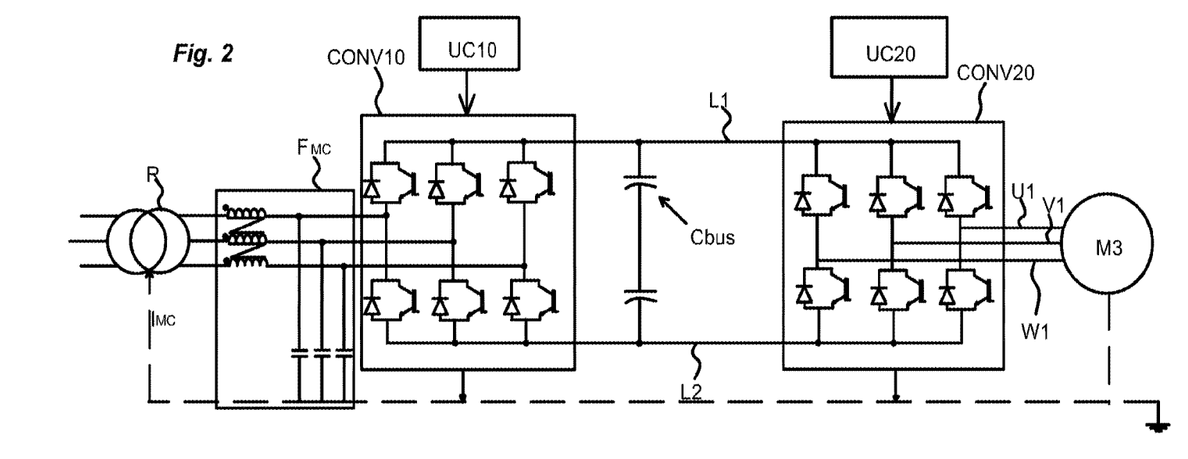
FIG. 2 represents the architecture of a control installation for an electric motor, having an active rectifier and an inverter connected to an electric motor.

Using the same reference symbols as those employed in FIG. 1A for common and identical elements, a second installation architecture is represented in FIG. 2, and comprises:

A number of input phases connected to an electricity supply system R, for example three input phases, in the event of connection to a three-phase system.

A first converter CONV10 comprised of an active rectifier for the transformation of the AC voltage delivered by the supply system into a DC voltage. The converter has a plurality of switching arms, each incorporating, for example, at least two power transistors, for example of the IGBT type. In English, this type of converter with an active rectifier stage on the input side is commonly described as "active front end".

A DC supply bus having a first supply line L1 at a positive potential and a second supply line L2 at a negative potential, between which the DC voltage is applied.

At least one bus capacitor Cbus connected between the first supply line and the second supply line, and designed to maintain a constant DC voltage on the bus.

A second CONV20, comprised of an inverter connected to the DC supply bus and having a plurality of switching arms connected in parallel between the two supply lines L1, L2 of the bus. Each switching arm incorporates at least two transistors, for example of the IGBT type, connected in series.

Output phases U1, V1, W1, each connected to a mid-point between two transistors in a separate switching arm of the inverter, and designed for connection to an electric motor M3.

In the attached figures, the converters represented are connected to a three-phase supply, and are of the two-level type, i.e. they incorporate two power transistors which are controlled by switching arms. Naturally, the invention can be applied to architectures incorporating converters with three levels or more.

In a conventional manner, command functions on the transistors of each converter CONV1, CONV2, CONV10, CONV20 are executed by pulse width modulation (hereinafter "PWM"). PWM of the intersective type involves the comparison of a symmetrical or asymmetrical triangular carrier signal with one or more modulating signals. For a power transistor in the inverter stage or the rectifier stage, intersections between a carrier signal and one or more modulating signals define the switching times for the closing and opening of the transistor.

For the control of its converters, the installation represented in FIG. 1A or in FIG. 2 incorporates an appropriate control system. The control system may comprise a common control unit for all the converters, or a separate control unit associated with each converter. In the remainder of the description, and not by way of limitation, we will consider a solution in which a separate control unit is dedicated to the control of a particular converter. Two separate control units UC1, UC2 are thus employed for the respective control of the first converter CONV1 and the second converter CONV2 of the installation according to the architecture shown in FIG. 1A. Two separate control units UC10, UC20 are thus employed for the respective control of the first converter CONV10 and the second converter CONV20 of the installation according to the architecture shown in FIG. 2.

Each control unit UC1, UC2, UC10, UC20 determines switching times by pulse width modulation, and submits corresponding control commands to the transistors of the converter with which it is associated. Each transistor is associated with a grid control device, which receives control commands from its associated control unit. Each control unit specifically comprises a microprocessor and memory facilities.

In both architectures, a common mode filter $F_{MC}$ incorporating a common mode inductance is arranged on the input phases connected to the supply grid, for the filtering-out of electromagnetic interference generated by the switching of converters. This type of filter is well-known, and will not be described in detail in the present application. In a known manner, it specifically comprises an inductance having a magnetic core around which three windings are arranged, each connected in series to a separate input phase.

In an architecture with two converters connected to the DC supply bus, the flux received by the inductance of the common mode filter arranged at the front end is a function of the combination of the common mode voltages generated by the various converters.

According to the invention, it is possible to demonstrate that the flux received by the common mode inductance is a function of the integral of the common mode voltages.

Figure 1C:
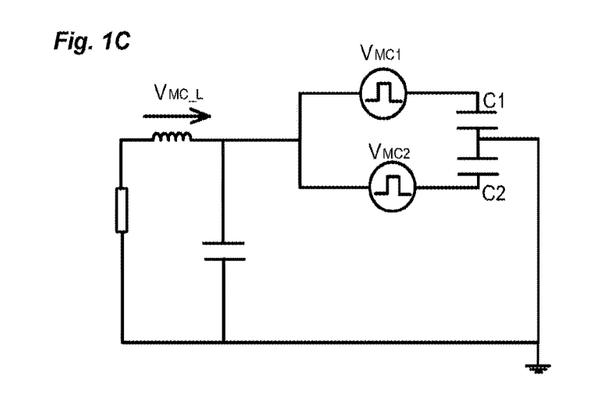
FIG. 1C illustrates the common mode voltages generated by an installation of the type represented in FIGS. 1A and 1B.

With reference to FIG. 1C, which shows a simplified representation of the architecture shown in FIG. 1A and in FIG. 1B, this common mode voltage $V_{MC\_L}$, considered from the inductance, is a function of the following:
The common mode voltages $V_{MC1}$, $V_{MC2}$ generated by each of the two converters in the system,
The stray capacitances C1, C2 present between the power conductors and ground.

However, the maximum magnetic flux generated in the inductance of the filter changes over time in an uncontrolled manner, potentially resulting in the saturation of its magnetic core. In order to counter the probability of the saturation of the magnetic core of the inductance, the simplest solution involves the over-dimensioning of the filter to accommodate the least favourable case.

In FIGS. 1A and 2, the path followed by the common mode current $I_{MC}$ is represented by the dashed line.

However, the invention described hereinafter permits the limitation of the over-dimensioning of the filter, by proposing the control of the flux received by the inductance of the common mode filter $F_{MC}$.

The invention will be described more specifically with reference to the architecture of the installation represented in FIG. 1A. However, it should be understood that the solution will be identical for the variant shown in FIG. 1B and for the second architecture of the installation represented in FIG. 2, and that it will be reproducible for any architecture which incorporates more than two converters connected in parallel.

To this end, the invention acts upon the phase-shift angle Ψ between the carrier signals employed for the control of each of the converters CONV1, CONV2 in the installation.

For the control of each transistor in the first converter, a first pulse width modulation is deployed by the first control unit UC1, employing at least a first carrier signal generated at a first chopping frequency $f_{sw1}$, and a first modulating signal.

For the control of each transistor in the second converter, a second pulse width modulation is deployed by the second control unit UC2, employing at least a second carrier signal generated at a second chopping frequency $f_{sw2}$, and a second modulating signal.

Figure 3A:
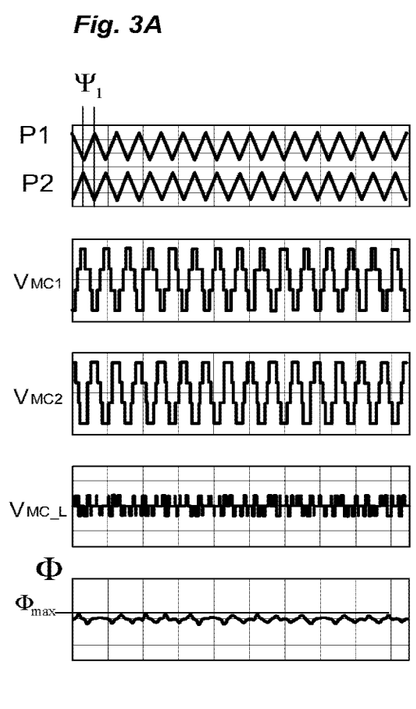
FIGS. 3A and 3B illustrate the variation in the magnetic flux as a function of the phase shift applied between two carrier signals.
Figure 3B:
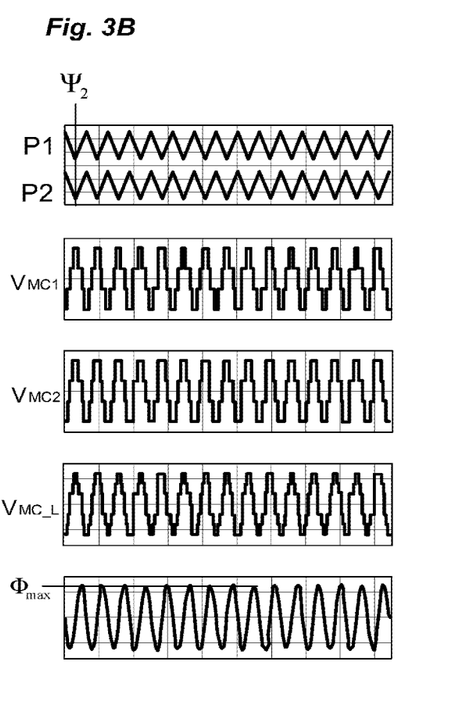

FIGS. 3A and 3B illustrate the variation in the maximum flux $\Phi_{max}$ received by the inductance of the common mode filter when the first converter CONV1 is controlled with a first carrier signal P1 generated at a first chopping frequency $f_{sw1}$ and the second converter CONV2 is controlled with a second carrier signal P2 generated at a second chopping frequency $f_{sw2}$, wherein the two carrier signals are phase-displaced by a phase shift angle $\Psi_1$, $\Psi_2$ which differs between FIG. 3A and FIG. 3B. In FIG. 3A, the phase-shift angle is not zero, and in FIG. 3B the phase-shift angle is selected, for example at zero. Between these two figures, the influence of the phase-shift angle between the carrier signals upon the value of the maximum flux received by the inductance of the filter can be observed. In FIG. 3A, the maximum flux detected is, in practice, lower than in FIG. 3B.

The object of the invention is thus the determination of an optimum phase-shaft angle $\Psi_{opt}$ to be applied between the first carrier signal and the second carrier signal, such that the maximum flux $\Phi_{max}$ v received by the inductance of the common mode filter will be as low as possible, thereby permitting the prevention of any saturation of its magnetic core. One of the two carrier signals will be defined as the reference carrier signal, while the other will be phase-displaced in relation to the other by the optimum phase-shift angle $\Psi_{opt}$ thus determined.

The optimum phase-shift angle $\Psi_{opt}$ to be applied between the two carrier signals is determined on the basis of a ratio, designated as ki, between the chopping frequencies $f_{sw1}$, $f_{sw2}$. This ratio will assume a number of distinct values, depending upon the value of the first chopping frequency and the value of the second chopping frequency. It is defined arbitrarily by the following relationship:

$$k_i = \frac{f_{sw1}}{f_{sw2}}$$

Where:
i ranges from 1 to n, and n is equal to or greater than 2,
$f_{sw1}$ is the chopping frequency of the first carrier signal,
$f_{sw2}$ is the chopping frequency of the second carrier signal.

According to the value assumed by each chopping frequency, the value of the ratio ki will therefore vary. For each ratio between the two chopping frequencies, it is possible to apply a number of phase-shift angles between the two carrier signals. For each of these phase-shift angles, the maximum flux received by the inductance of the common mode filter will potentially be different. A notional optimum phase-shift angle $\Psi_{i\_opt\_th}$ will thus be associated with each value of the ratio ki at which the maximum flux received by the common mode inductance is theoretically minimal, if the arrangement of the architecture is symmetrical with regard to the ground.

Figure 5:
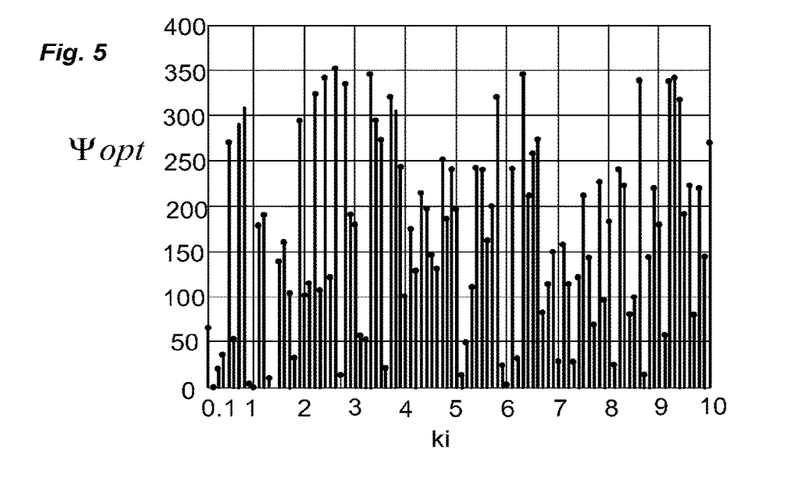
FIG. 5 represents an example of the data table showing the phase shift to be applied between two carrier signals, as a function of the ratio between the two chopping frequencies.

Preferably, the notional optimum phase-shift angles $\Psi_{i\_opt\_th}$ are, for example, stored in conjunction with each ratio ki in a predefined data table. FIG. 5 shows a representation of the data table establishing the relationship between each phase-shift angle $\Psi_{i\_opt\_th}$ as a function of a ratio ki between the first chopping frequency and the second chopping frequency.

The predefined data table will preferably be stored in the memory facilities of one or of both the control units UC1, UC2. The data table may be established during a learning phase or by simulation, before being loaded into the memory facilities. For the establishment thereof, for each value of the ratio ki between the two chopping frequencies, this will involve:
- the scanning of the various potential values for the phase-shift angle,
- for each phase-shift angle, the determination, by measurement or by calculation, of the magnetic flux received by the inductance of the common mode filter,
- for each phase-shift angle, the determination of the maximum magnetic flux received by the common mode inductance,
- the memorization of the notional optimum phase-shift angle $\Psi_{i\_opt\_th}$ at which the maximum magnetic flux assumes its minimum value.

On the basis of these general principles, a distinction is drawn between two cases:
- A first case, in which the stray capacitances C1 and C2 are equal, i.e. the arrangement is symmetrical with regard to the ground,
- A second case, in which the stray capacitances are different, i.e. the arrangement is asymmetrical with regard to the ground.

In the first case, the cables, the electric motors and the connection to ground are considered as identical. Accordingly, the flux received by the inductance of the common mode filter $F_{MC}$ is a function of the sum of the common mode voltages generated by each converter CONV1, CONV2, and varies as a function of the two chopping frequencies $f_{sw1}$, $f_{sw2}$ applied to the two aforementioned carrier signals.

In the first case, the optimum phase-shift angle $\Psi_{opt}$ to be applied between the two carrier signals corresponds directly to the notional optimum phase-shift angle $\Psi_{i\_opt\_th}$ which is associated with the ratio ki determined between the two chopping frequencies.

Figure 6:
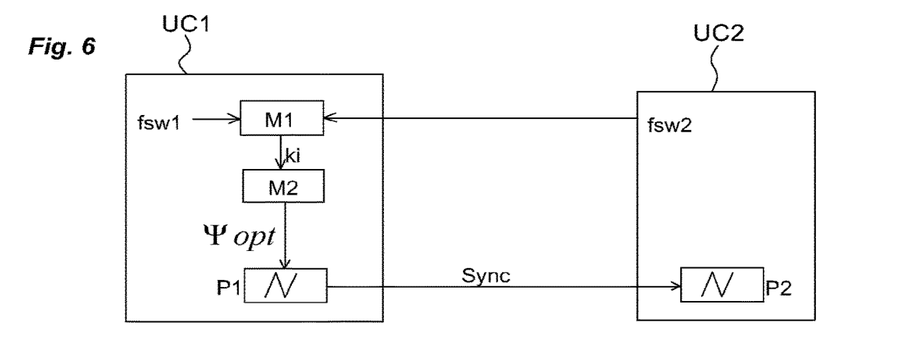
FIG. 6 shows a schematic illustration of the principle of the invention, in a first operating case.

In this first case, the control method according to the invention thus follows the steps described hereinafter with reference to FIG. 6. It is considered, for example, but not by way of limitation, that the various steps of the method are deployed by a first control unit UC1, associated with the control of the first converter CONV1. It should be understood, however, that this deployment may be undertaken by the second control unit. The first carrier signal is therefore defined arbitrarily as the reference carrier signal.

The first control unit UC1 associated with the first converter CONV1 comprises a software reader module which is designed to read the value of the first chopping frequency $f_{sw1}$ of the first carrier signal generated for the control of the first converter, and to submit a request to the second control unit UC2 for the acquisition of the value of the second chopping frequency $f_{sw2}$ of the second carrier signal applied by the second control unit UC2 for the control of the second converter CONV2. Upon the receipt of the request, the second control unit UC2 submits the value of the second chopping frequency $f_{sw2}$ to the first control unit UC1.

The first control unit UC1 is designed to activate a calculation module M1 for the ratio ki between the two chopping frequency values thus obtained.

On the basis of the ratio ki calculated, the first control unit UC1 runs a module M2 for the determination of an optimum phase-shift angle $\Psi_{opt}$ to be applied between the first carrier signal, which constitutes the reference carrier signal, and the second carrier signal. As described above, the optimum phase-shift angle $\Psi_{opt}$ may be obtained by a direct read-off from the predetermined data table (FIG. 5).

The first control unit UC1 is designed to apply the optimum phase-shift angle $\Psi_{opt}$ thus determined between the two carrier signals. To this end:
- The first control unit UC1 runs a detection module, which is designed to detect the time at which the first carrier signal P1 achieves a minimum value.
- On the basis of the time determined, the first control unit UC1 initiates a counter function for a time interval corresponding to the optimum phase-shift angle $\Psi_{opt}$ to be applied. Once this time interval is achieved, the first control unit UC1 runs a synchronization module which generates a synchronization bit Sync for transmission to the second control unit UC2.
- Upon the reception of the synchronization bit Sync, the second control unit UC2 runs a module for the resetting of the second carrier signal P2, wherein this module is designed to force the second carrier signal P2 to the minimum value.

The aforementioned steps must be redeployed, if the ratio ki between the two chopping frequencies is modified.

Figure 4:
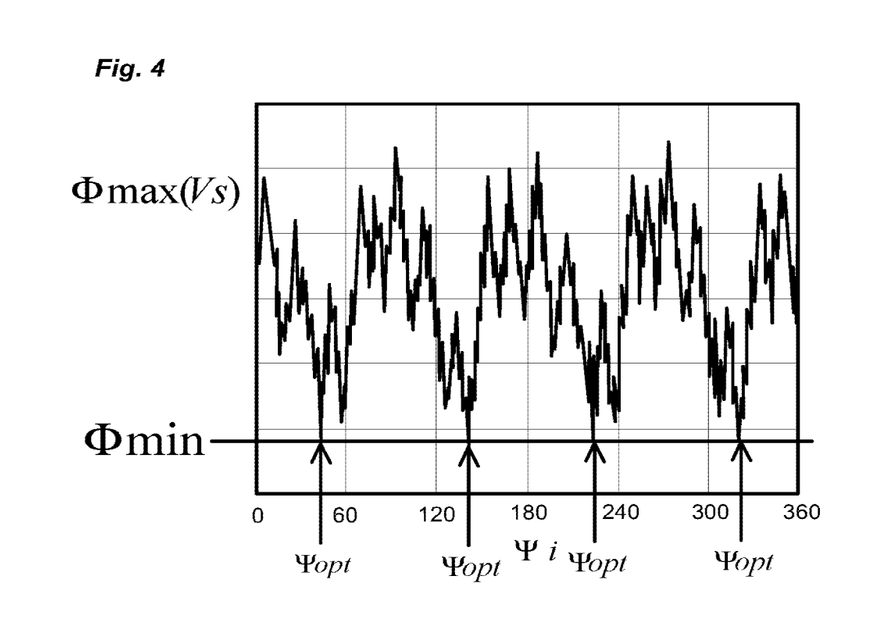
FIG. 4 represents the curve for the variation in the maximum flux, considered from the inductance of the common mode filter, as a function of the phase-shift angle applied between two carrier signals.

FIG. 4 illustrates the variation in the maximum flux obtained as a function of the optimum phase-shift angle $\Psi_i$ applied between the carrier signals. It can thus be seen that a minimum flux exists for one or more values of the optimum phase-shift angle between the carrier signals.

In a control installation executed according to the second aforementioned architecture, i.e. with a first converter CONV10 of the active rectifier type and a second converter CONV20 of the inverter type connected to the electric motor, wherein the optimum phase-shift angle $\Psi_{i\_opt\_th}$ determined by the aforementioned method must be adjusted by a value of 180°. Naturally, this will apply if the first converter CONV10 and the second converter CONV20 are identical.

In the second case described above, the arrangements are no longer identical with regard to the ground, such that the motors and/or cabling of the two converters are different, thereby resulting in separate values for stray capacitances.

In the second case, the optimum phase-shift angle $\Psi_{opt}$ to be applied will not be the notional optimum phase-shift angle $\Psi_{i\_opt\_th}$ deduced directly from the ratio between the two chopping frequencies, as the stray capacitances C1, C2 have separate values. A correction function must therefore be applied to the notional optimum phase-shift angle $\Psi_{i\_opt\_th}$ deduced from the ratio between the two chopping frequencies. This correction can be deployed in real time during the operation of the system, or can be determined in advance of this operation by simulation or by the deployment of a learning phase. A new data table for the association of a corrected notional optimum phase-shift angle with each value of the ratio ki can then, for example, be established and saved in the memory facilities of the control unit.

For the determination of the correction to be applied, the first control unit UC1 must determine the actual magnetic flux flowing in the inductance of the common mode filter. This actual magnetic flux can be determined:
- By direct measurement in the inductance, using a magnetic flux sensor,
- By indirect measurement, on the basis of the voltages at the terminals of the inductance of the common mode filter. For a three-winding inductance, this gives:

$$V_{MC\_coil} = \frac{V_1 + V_2 + V_3}{3}$$

Where V1, V2 and V3 are the voltages at the terminals of each winding in the inductance.

The associated magnetic flux is deduced from the following relationship:

$$\Phi = \frac{1}{N} \int V_{MC\_coil} dt$$

Figure 7:
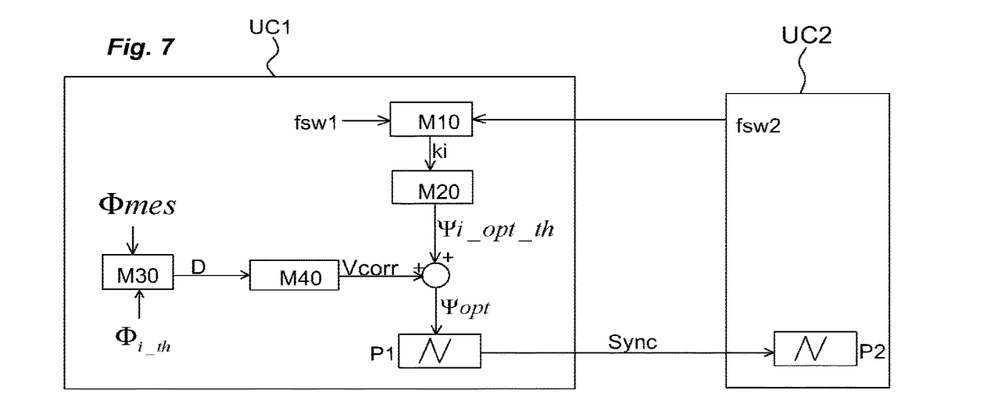
FIG. 7 shows a schematic illustration of the principle of the invention, in a second operating case.

With reference to FIG. 7, in consideration of a correction of the notional optimum phase-shift angle $\psi_{i\_opt\_th}$ executed in real time, the method according to the invention deployed in the control system thus comprises the following steps:

The first control unit UC1 associated with the first converter CONV1 comprises a software reader module which is designed to read the value of the first chopping frequency $f_{sw1}$ of the first carrier signal P1 generated for the control of the first converter CONV1, and to submit a request to the second control unit UC2 for the acquisition of the value of the second chopping frequency $f_{sw2}$ of the second carrier signal P2 applied by the second control unit UC2 for the control of the second converter CONV2. Upon the receipt of the request, the second control unit UC2 submits the value of the second chopping frequency to the first control unit.

The first control unit UC1 is designed to activate a calculation module M10 for the ratio ki between the two chopping frequency values thus obtained.

On the basis of the ratio ki calculated, the first control unit UC1 runs a module for the determination of the notional optimum phase-shift angle $\Psi_{i\_opt\_th}$ to be applied between the two carrier signals. As described above, the notional optimum phase-shift angle $\Psi_{i\_opt\_th}$ may be obtained by a direct read-off from the predetermined data table (FIG. 5). This notional optimum phase-shift angle $\Psi_{i\_opt\_th}$ corresponds to a notional minimum flux $\Phi_{i\_th}$ which, for example, will be saved in the data table and read by the first control unit UC1.

At the same time, the first control unit defines an actual minimum flux $\Phi_{mes}$ on the basis of the magnetic flux determined by one of the aforementioned methods, i.e. by direct or indirect measurement over a predetermined processing interval, for example equal to one second, wherein this interval will be valid, regardless of the chopping frequencies on the various converters.

The first control unit runs a comparison module M30, which is designed to compare the notional minimum flux $\Phi_{i\_th}$ with the actual minimum flux $\Phi_{mes}$ and to determine a differential D. The differential D is, for example, loaded into a correction module M40, for example of the proportional integral corrective type, for the deduction therefrom of the correction Vcorr to be applied to the notional optimum phase-shift angle $\Psi_{i\_opt\_th}$. The corrective value is added to the notional optimum phase-shift angle $\Psi_{i\_opt\_th}$ to obtain a corrected phase-shift angle which corresponds to the optimum phase-shift angle $\Psi_{opt}$ for the achievement of the actual minimum flux.

The first control unit UC1 then applies the optimum phase-shift angle $\Psi_{opt}$ thus determined between the two carrier signals P1, P2. To this end:

The first control unit UC1 runs a detection module, which is designed to determine a detection time at which the first carrier signal P1 achieves a minimum value.

With effect from the detection time thus determined, the first control unit UC1 initiates a counter function for a time interval corresponding to the optimum phase-shift angle $\Psi_{opt}$ to be applied. Once this time interval is achieved, the first control unit UC1 generates a synchronization bit for transmission to the second control unit UC2.

Upon the reception of the synchronization bit, the second control unit UC2 runs a module for the resetting of the second carrier signal P2, which is designed to force the second carrier signal to the minimum value.

The aforementioned steps must be redeployed, if the ratio between the two chopping frequencies is modified.

The two methods described above, for a symmetrical or asymmetrical arrangement with regard to the ground, are applicable in a similar manner, if the installation comprises more than two converters. In an architecture incorporating more than two converters, the optimum phase-shift angle to be applied to each carrier signal on each converter, in relation to the reference carrier signal, must be determined. The combined series of optimum phase angles corresponds to a minimum flux value received by the inductance of the common mode filter. This series is associated with a series of ratios, wherein each ratio in the series is determined on the basis of the chopping frequency of a carrier signal associated with a specific converter and the chopping frequency of the reference carrier signal. Accordingly, for each series of ratios, there is a series of optimum phase-shift angles to be applied for the achievement of a minimum magnetic flux. The association between each series of ratios and a series of optimum phase-shift angles is, for example, saved in a data table. As described above, this data table can be established during a learning phase, or by simulation, by scanning the various parameters and selecting those data series at which the magnetic flux is minimal.

The present invention thus has numerous advantages. It permits:

The optimization of the maximum flux value received by the inductance of the common mode filter, in a control system architecture comprising a plurality of inverters connected in parallel to a common DC supply bus.

The optimization of the maximum flux received by the inductance of the common mode filter, in a control system architecture comprising one active rectifier and one inverter.

The optimization of the maximum flux received by the inductance of the common mode filter, in a symmetrical or asymmetrical architecture with regard to the ground.

Recovery from a state of saturation of the inductance, by the deployment of the method according to the invention on a one-off basis.

The optimum dimensioning of the common mode filter, thereby avoiding any problems of cost or space.

The invention claimed is:

1. A control method deployed in a control installation of an electric motor, wherein said control installation includes:
   a number of input phases, which are designed for connection to an electric grid system for the delivery of an AC voltage,
   a common mode filter connected on the input phases, comprising at least one inductance,
   a DC supply bus, which is arranged for the delivery of a DC voltage,
   a first converter connected to said DC supply bus, controlled for the application of the first voltage pulse edges to an electric motor by a first pulse width modulation, obtained by comparing a first carrier signal, described as the reference carrier signal, applied at a first chopping frequency, with a first modulating signal, a second converter connected to said DC supply bus and controlled by a second pulse width modulation, obtained by comparing a second carrier signal, applied at a second chopping frequency, with a second modulating signal, and said second carrier signal being designed to be out-of-phase with the reference carrier signal by a phase-shift angle, the control method comprising:

determining an optimum phase-shift angle from the first chopping frequency and the second chopping frequency, wherein said optimum phase-shift angle corresponds to a phase-shift angle for which the maximum magnetic flux received by the inductance of the common mode filter is at a minimum.

2. The method according to claim 1, further comprising determining a ratio between the first chopping frequency and the second chopping frequency.

3. The method according to claim 2, further comprising reading off a predefined data table containing a number of stored values for the ratio and, for each ratio value, a notional optimum phase-shift angle corresponding to a maximum magnetic flux.

4. The method according to claim 3, wherein the optimum phase-shift angle corresponds to said notional optimum phase-shift angle when the control installation has a symmetrical architecture with regard to the ground.

5. The method according to claim 3, wherein the optimum phase-shift angle corresponds to said notional optimum phase-shift angle, subject to addition of a corrective value, when the control installation has an asymmetrical architecture with regard to the ground.

6. The method according to claim 3, wherein the optimum phase-shift angle corresponds to the notional optimum phase-shift angle, subject to addition of a value of 180°, when the second converter in the control installation is of the active rectifier type.

7. The method according to claim 3, wherein, when the control installation comprises a third converter which is controlled by a third pulse width modulation, obtained by comparing a third carrier signal, applied at a third chopping frequency, with a third modulating signal, the method further comprising:

determining a first ratio between the chopping frequency of the first carrier signal and the chopping frequency of the second carrier signal;

determining a second ratio between the chopping frequency of the first carrier signal and the chopping frequency of the third carrier signal; and determining a series of two notional optimum phase-shift angles associated with a series formed by the first ratio and by the second ratio thus determined.

8. The method according to claim 4, further comprising detecting achievement by the first carrier signal of a minimum value, and synchronizing the second carrier signal in relation to the first carrier signal, in order to take account of the determined optimum phase-shift angle.

9. The method according to claim 5, wherein the corrective value is determined on the basis of the difference between a notional magnetic flux and an actual magnetic flux measured for the inductance of the common mode filter.

10. A control system associated with a control installation, which includes:

a number of input phases, which are designed for connection to an electric grid system for the delivery of an AC voltage, a common mode filter connected on the input phases, comprising at least one inductance, a DC supply bus, which is arranged for the delivery of a DC voltage, a first converter connected to said DC supply bus, controlled for the application of the first voltage pulse edges to an electric motor by a first pulse width modulation, obtained by comparing a first carrier signal, described as the reference carrier signal, applied at a first chopping frequency, with a first modulating signal, a second converter connected to said DC supply bus and controlled by a second pulse width modulation, obtained by comparing a second carrier signal, applied at a second chopping frequency, with a second modulating signal, and said second carrier signal being designed to be out-of-phase with the reference carrier signal by a phase-shift angle, the control system comprising:

circuitry configured to determine an optimum phase-shift angle from the first chopping frequency and the second chopping frequency, wherein said optimum phase-shift angle corresponds to a phase-shift angle for which a maximum magnetic flux received by the inductance of the common mode filter is at a minimum.

11. The system according to claim 10, wherein the circuitry is further configured to determine a ratio between the first chopping frequency and the second chopping frequency.

12. The system according to claim 11, wherein the circuitry is further configured to read-off a predefined data table containing a number of stored values for a ratio and, for each ratio value, a notional optimum phase-shift angle corresponding to said maximum magnetic flux thus determined.

13. The system according to claim 12, wherein the optimum phase-shift angle corresponds to said notional optimum phase-shift angle when the control installation has a symmetrical architecture with regard to the ground.

14. The system according to claim 12, wherein the optimum phase-shift angle corresponds to said notional optimum phase-shift angle, subject to addition of a corrective value when the control installation has an asymmetrical architecture with regard to the ground.

15. The system according to claim 12, wherein the circuitry is further configured to detect achievement by the first carrier signal of a minimum value, and synchronize the second carrier signal in relation to the first carrier signal, in order to take account of the optimum phase-shift angle thus determined.

16. The system according to claim 12, wherein the optimum phase-shift angle corresponds to the notional optimum phase-shift angle, subject to addition of a value of 180°, when the second converter in the control installation is of the active rectifier type.

17. The system according to claim 12, wherein, when the control installation comprises a third converter which is controlled by a third pulse width modulation, obtained by the comparison of a third carrier signal, applied at a third chopping frequency, with a third modulating signal, the circuitry is further configure to determine a first ratio between the chopping frequency of the first carrier signal and the chopping frequency of the second carrier signal, determine a second ratio between the chopping frequency of the first carrier signal and the chopping frequency of the third carrier signal, and determine a series of two notional optimum phase-shift angles associated with a series formed by the first ratio and the second ratio thus determined.

18. The system according to claim 14, wherein the corrective value is determined on the basis of the difference between a notional magnetic flux and an actual magnetic flux measured for the inductance of the common mode filter.

* * * * *